United States Patent
S G et al.

(10) Patent No.: US 11,295,492 B2
(45) Date of Patent: Apr. 5, 2022

(54) ELECTRONIC DEVICE AND SERVER RELATED TO RENDERING OF WEB CONTENT AND CONTROLLING METHOD THEREOF

(71) Applicant: Samsung Electronics Co., Ltd., Suwon-si (KR)

(72) Inventors: Naveen Kumar S G, Bangalore (IN); Pruthvi Kumar Madugundu, Bangalore (IN); Srirama Chandra Sekhar Mogali, Kakinada (IN); Joy Bose, New Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 15/223,652

(22) Filed: Jul. 29, 2016

(65) Prior Publication Data
US 2017/0031885 A1    Feb. 2, 2017

(30) Foreign Application Priority Data

Jul. 31, 2015   (IN) ............................ 3977/CHE/2015
Feb. 29, 2016   (IN) ............................ 3977/CHE/2015
Jul. 18, 2016   (KR) ......................... 10-2016-0090838

(51) Int. Cl.
*G06T 11/60*    (2006.01)
*H04L 67/02*    (2022.01)
(Continued)

(52) U.S. Cl.
CPC ................ *G06T 11/60* (2013.01); *G06F 3/14* (2013.01); *G06F 16/957* (2019.01); *G09G 5/363* (2013.01);
(Continued)

(58) Field of Classification Search
CPC ............. G06F 17/2247; G06F 17/2252; G06F 16/957; G06F 3/14; G06T 11/60;
(Continued)

(56) References Cited

U.S. PATENT DOCUMENTS 8,234,392 B2 * 7/2012 Graffagnino ........ G06F 17/2229
                                                         709/230
8,510,371 B2    8/2013 Peled
(Continued)

FOREIGN PATENT DOCUMENTS

KR    10-2008-0055821 A    6/2008
KR    10-2011-0097300 A    8/2011
WO       2015/090064 A1    6/2015

OTHER PUBLICATIONS

Kumar, N. A Hybrid Web Rendering Framework on Cloud, pp. 1-7 (Year: 2016).*

(Continued)

*Primary Examiner* — Cesar B Paula
*Assistant Examiner* — Carl E Barnes, Jr.
(74) *Attorney, Agent, or Firm* — Jefferson IP Law, LLP

(57) ABSTRACT

An electronic device associated with rendering of web content, a server, and a controlling method thereof are provided. The controlling method includes receiving a request for the web content from an electronic device by the server executing a program for a content renderer, generating a render structure associated with render commands by the server executing the program for the content renderer, and sending, by the server executing the program for the content renderer, the render structure to the electronic device to render the web content, and the render commands are issued to each layer of a rendering engine to render the web content of the electronic device.

8 Claims, 17 Drawing Sheets

(51) Int. Cl.
*G09G 5/36* (2006.01)
*G06F 3/14* (2006.01)
*G06F 16/957* (2019.01)
*H04W 88/02* (2009.01)

(52) U.S. Cl.
CPC ......... *H04L 67/02* (2013.01); *G09G 2340/10* (2013.01); *G09G 2350/00* (2013.01); *G09G 2360/06* (2013.01); *G09G 2360/08* (2013.01); *G09G 2370/022* (2013.01); *G09G 2370/027* (2013.01); *H04W 88/02* (2013.01)

(58) Field of Classification Search
CPC ......... G06T 13/00; G06T 10/60; G09G 5/363; G09G 2340/10; G09G 2350/00; G09G 2360/06; G09G 2360/08; G09G 2370/022; H04L 67/02; H04W 88/02
See application file for complete search history.

(56) References Cited

U.S. PATENT DOCUMENTS

| | | | |
|---|---|---|---|
| 8,527,563 | B2 | 9/2013 | Brugiolo |
| 8,878,857 | B2 * | 11/2014 | Graffagnino ........ G06F 17/2229 345/473 |
| 8,913,067 | B1 | 12/2014 | Kokkevis |
| 9,454,515 | B1 * | 9/2016 | Jain ..................... G06F 17/2247 |
| 9,922,007 | B1 * | 3/2018 | Jain ..................... G06F 16/9577 |
| 2003/0014478 | A1 | 1/2003 | Noble |
| 2007/0079244 | A1 | 4/2007 | Brugiolo |
| 2010/0194753 | A1 | 8/2010 | Robotham et al. |
| 2011/0161400 | A1 | 6/2011 | Silyaev et al. |
| 2011/0162023 | A1 | 6/2011 | Kellerman et al. |
| 2012/0188255 | A1 * | 7/2012 | Brunner .................. G06T 13/00 345/473 |
| 2012/0260157 | A1 | 10/2012 | Zhu |
| 2012/0265802 | A1 * | 10/2012 | Shen ....................... H04L 67/02 709/203 |
| 2013/0055072 | A1 * | 2/2013 | Arnold .................. G06T 15/005 715/240 |
| 2013/0080887 | A1 | 3/2013 | Hou |
| 2013/0268843 | A1 | 10/2013 | Xu et al. |
| 2014/0195894 | A1 | 7/2014 | Sharma |
| 2015/0120823 | A1 | 4/2015 | D'Aurelio et al. |
| 2015/0193401 | A1 * | 7/2015 | Kim ..................... G06F 16/9577 715/234 |
| 2015/0279058 | A1 * | 10/2015 | Dong .................... G06F 16/957 345/582 |
| 2015/0370439 | A1 * | 12/2015 | Val ........................ G06F 3/0485 715/830 |
| 2016/0216874 | A1 * | 7/2016 | Bayston ................ G06F 3/0481 |
| 2019/0123766 | A1 * | 4/2019 | Huang ............... H03M 13/2948 |

OTHER PUBLICATIONS

European Search Report dated May 11, 2018, issued in European Patent Application No. 16833285.6.
European Search Report dated May 15, 2019, issued in European Application No. 16 833 285.6-1213.
European Examination Report dated Nov. 7, 2019, issued in European Patent Application No. 16833285.6-121.
Indian Examination Report dated Feb. 28, 2020, issued in Indian Patent Application No. 3977/CHE/2015.
Korean Office Action dated Jul. 26, 2021, issued in Korean Patent Application No. 10-2016-0090838.

* cited by examiner

ELECTRONIC DEVICE AND SERVER RELATED TO RENDERING OF WEB CONTENT AND CONTROLLING METHOD THEREOF

CROSS-REFERENCE TO RELATED APPLICATION(S)

This application claims the benefit under 35 U.S.C. § 119(a) of an Indian Provisional application filed on Jul. 31, 2015 in the Indian Patent Office and assigned Serial number 3977/CHE/2015, and under 35 U.S.C. § 119(a) of an Indian patent application filed on Feb. 29, 2016 in the Indian Patent Office and assigned Serial number 3977/CHE/2015, and of a Korean patent application filed on Jul. 18, 2016 in the Korean intellectual Property Office and assigned Serial number 10-2016-0090838, the entire disclosure of which is hereby incorporated by reference.

TECHNICAL FIELD

The present disclosure relates to an electronic device associated with rendering of web content, a server, and a controlling method thereof. More particularly, the present disclosure relates to an electronic device which renders web content, a server supporting rendering of web content, and a controlling method thereof.

BACKGROUND

Generally, user accesses web content on the internet by: (1) executing a "web browser" locally on data processing device(s) (e.g., an electronic device(s), internet of things (IoT) devices, and a mobile device such as a smart phone, personal digital assistant (PDA), or the like) and, (2) interconnecting to a server coupled to a network associated with the data processing device. The web browser receives the web content in a format comprehensible by the web browser. The format such as for e.g., hypertext mark-up language (HTML) or parser. The web browser then interprets and generates corresponding display in accordance with the received input format, the HTML or the parser, through a rendering engine.

The display quality of the web content rendered through the rendering engine, associated with sever based web browsers, is not accurate as the rendering process is executed on the server itself, which causes the rendering issues. The display of the web content rendered through the rendering engine, associated with the client based browsers (data processing device locally) affects the performance of the data processing device, as the rendering process consumes more power (random access memory (RAM) usage, processing time, battery or the like). Thus, it's a cumbersome rendering process, which therefore causes the rendering issues.

Albeit, the method: web browser mini rendering system where the HTML files to be rendered is converted to an intermediate light weight format. The converted rendered file loses some rendering quality. The rendering of the content, from the rendering engine associated with the server based browsers, like text, shapes, spacing between elements is not exactly same as client based browsers and also the pixel by pixel comparison is not exactly identical in the aforementioned method.

Thus, there is a need of a simple and robust mechanism to improve the quality of the web content, associated with the web browser, rendered through both the server based and the client based rendering systems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mechanism for receiving, by a content renderer at a server, a request for the web content from an electronic device.

Another aspect of the present disclosure is to provide a generating, by the content renderer, a render structure comprising draw commands, wherein the draw commands are issued to each layer of a rendering engine to render the web content on the electronic device.

Another aspect of the present disclosure is to provide a mechanism for sending, by the content renderer, the render structure to the electronic device to render the web content.

Another aspect of the present disclosure is to provide a mechanism for sending, by a content renderer at an electronic device, a request for the web content to a server.

Another aspect of the present disclosure is to provide a mechanism for receiving, by the content renderer, a render structure comprising draw commands from the server, where the draw commands are issued to each layer of a rendering engine to render the web content on the electronic device.

Another aspect of the present disclosure is to provide a mechanism for causing, by the content renderer, to render the web content on a screen of the electronic device based on the render structure.

In accordance with an aspect of the present disclosure, a method of controlling a server which supports rendering of web content is provided. The method includes receiving a request for the web content from an electronic device by the server executing a program for a content renderer; generating a render structure associated with render commands by the server executing the program for the content renderer; and sending, by the server executing the program for the content renderer, the render structure to the electronic device to render the web content where the render commands are issued to each layer of a rendering engine to render the web content of the electronic device.

In accordance with an aspect of the present disclosure, a method to cause rendering of web content is provided. The method includes receiving, by a content renderer at a server, a request for the web content from an electronic device. Further, the method includes generating, by the content renderer, a render structure at the server comprising render layers, graphics layers or any other layers responsible for smooth animations including transitions, transforms, scroll, zoom. The render structure comprises render commands, wherein the render commands are issued to each layer of a rendering engine to render the web content on the electronic device. Further, the method includes sending, by the content renderer, the render structure to the electronic device to render the web content.

In accordance with another aspect of the present disclosure, a method of controlling an electronic device which renders web content is provided. The method includes sending, by the electronic device executing a program for a content renderer, a request for the web content to a server;

receiving, by the electronic device executing the program for the content renderer, a render structure comprising render commands from the server; causing to render the web content on a device screen based on the render structure, by the electronic device executing the program for the content renderer, where the render commands are issued to each layer of a rendering engine to render the web content on the electronic device.

In accordance with another aspect of the present disclosure, a server for assisting rendering of web content is provided. The server includes a memory, and a processor coupled to the memory, where the processor is configured to execute a program for a content renderer to receive a request for the web content from an electronic device, to generate a render structure comprising render commands, and to send the render structure to the electronic device to render the web content, and where the render commands are issued to each layer of a rendering engine to render the web content on the electronic device.

In accordance with another aspect of the present disclosure, a server to cause rendering of web content is provided. The server includes a memory, a content renderer, and a controller unit coupled to the content renderer, where the content renderer is configured to receive a request for the web content from an electronic device. Further, the content renderer is configured to generate a render structure comprising render commands, where the render commands are issued to each layer of a rendering engine to render the web content on the electronic device. Further, the content renderer is configured to send the render structure to the electronic device to render the web content.

In accordance with another aspect of the present disclosure, an electronic device to cause rendering of web content is provided. The electronic device includes a memory, a content renderer, and a controller unit coupled to the content renderer, where the content renderer is configured to send a request for the web content to a server. Further, the content renderer is configured to receive a render structure comprising render commands from the server, where the render commands are issued to each layer of a rendering engine to render the web content on the electronic device. Furthermore, the content renderer is configured to cause to render the web content on a screen of the electronic device based on the render structure.

In accordance with another aspect of the present disclosure, a computer program product comprising computer executable program code recorded on a non-transitory computer-readable storage medium is provided. The computer executable program code, when executed, includes receiving, by a content renderer at a server, a request for the web content from an electronic device. Further, the computer executable program code, when executed, includes generating, by the content renderer, a render structure comprising render commands, where the render commands are issued to each layer of a rendering engine to render the web content on the electronic device. Further, the computer executable program code, when executed, includes sending, by the content renderer, the render structure to the electronic device to render the web content.

In accordance with another aspect of the present disclosure, a computer program product comprising computer executable program code recorded on a non-transitory computer-readable storage medium is provided. The computer executable program code, when executed, includes sending, by a content renderer at an electronic device, a request for the web content to a server. Further, the computer executable program code, when executed, includes receiving, by the content renderer, a render structure comprising render commands from the server, where the render commands are issued to each layer of a rendering engine to render the web content on the electronic device. Furthermore, the computer executable program code, when executed, includes causing, by the content renderer, to render the web content on a screen of the electronic device based on the render structure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
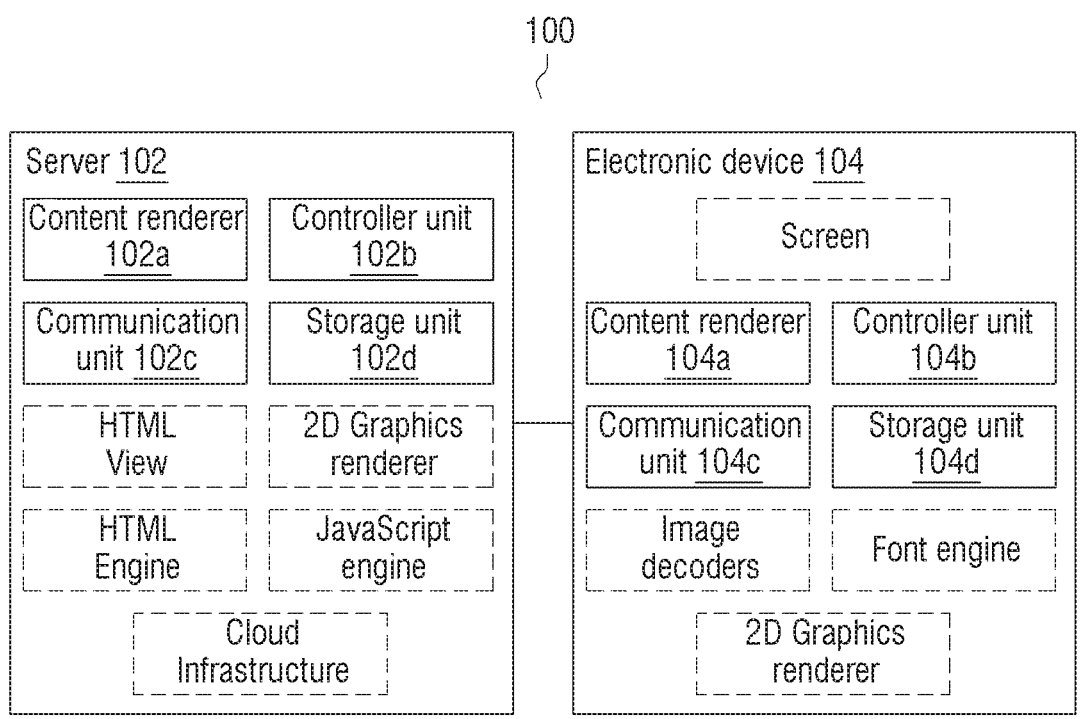
FIG. 1 illustrates a block diagram of a system to cause rendering of web content according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment, web content rendering is a process of rendering web pages, web images, or the like accessed by an electronic device through a web browser application. The web content rendering includes a rendering framework (e.g., a rendering engine), residing in the electronic device and a rendering framework (e.g., a rendering engine), residing in the server interconnected to the electronic device. The rendering framework residing in the electronic device can include a plurality of components (e.g., image decoders, a font engine, 2-dimensional (2D) graphics renderer, a device screen, or the like). The rendering framework residing in the server can include a plurality of components (e.g., hypertext mark-up language (HTML) view, a 2D graphics renderer, an HTML engine, a JavaScript (JS) engine, a cloud infra, or the like).

For example, consider the electronic device accesses web content on the interne (e.g., network) by executing a web browser application associated with the electronic device. At first, the rendering engine associated with the electronic device receives the web content (e.g., HTML, cascading style sheets (CSS), JS, or the like) thereon, the rendering engine, parses the received web content from the internet. Further, the rendering engine creates various trees (e.g., a document object model (DOM) tree, a render tree, or the like) based on the web content parsed.

Furthermore, based on the web content the rendering engine creates one or more layers i.e. render layers. The render layers include one or more action(s) to be performed on the web content displayed on to the electronic device. The one or more action includes for e.g., enabling flick tab, increasing zooming performance, scrolling, or the like. Based on the web content the one or more layers can be varied (increased or decreased). Each render layer can have its own rendering surface where the content is painted by the graphics engine associated with the electronic device. As such when a user of the electronic device flicks the screen, the corresponding render layer is composited onto the screen of the electronic device.

Thus as detailed above the entire rendering mechanism is executed at the electronic device which therefore affects the performance of the electronic device thereof reducing the quality of the web content displayed on the screen, rendered by the rendering engine.

In another example, consider the server interconnected to the electronic device. The server includes the rendering engine to render the web content onto the electronic device. The web content (e.g., the HTML, CSS, the JS or the like) received at the rendering engine is converted to an intermediate light weight format which does not support HTML specification. Further, the rendering engine performs the partial JS execution on the received web content, also the absence of creating render layers and the graphics layers on to the server results in no transformation or animations supported for the displayed web content onto the electronic device.

The embodiments herein disclose a method to cause rendering of the web content. The method includes receiving a request for the web content from the electronic device. Further, the method includes generating a render structure associated with render commands, where the render commands are issued to each layer of a rendering engine to render the web content on the electronic device. Furthermore, the method includes sending the render structure to the electronic device to render the web content.

In an embodiment, generating the render structure associated with the render commands includes cloning, by a render layer pool, a plurality of render layers obtained from the DOM tree. Further, a display layer for one or more render layers cloned by the render layer pool are maintained by a display layer pool. Further, maintaining, by a display render painter, draw commands as the render commands in a data structure, where the draw command is issued to paint each of the display layers to render the web content on the electronic device. Furthermore, writing, by the display render painter, the data structure to the render structure.

In an embodiment, generating the render structure, by the content renderer, associated with the render commands includes merging, by a display renderer, render layers and display layers into a composite layer. Further, the method includes maintaining, by a render structure painter, draw commands as the render commands in a data structure, Where the draw commands includes displays instructions to render the web content on the electronic device. Furthermore, the method includes writing, by the render structure painter, the data structure to the render structure.

In an embodiment, generating the render structure associated with the render commands includes merging, by the display renderer, render layers and display layers into the composite layer. Further, maintaining, by a render structure painter (e.g., the display renderer), draw commands as the render commands in the data structure, where the draw commands displays instructions to render the web content on the electronic device. Furthermore, writing, by the display renderer, the data structure to be streamed to the client.

Accordingly, the embodiments herein provide a method to cause rendering of web content. The method includes sending, by the content renderer at the electronic device, a request for the web content to the server. Further, the method includes receiving, by the content renderer, the render structure comprising the render commands from the server, where the render commands are issued to each layer of a rendering engine to render the web content on the electronic device. Furthermore, the method includes causing, by the content renderer, to render the web content on to the screen of the electronic device based on the render structure.

In an embodiment, causing, by the content renderer, to render the web content on to the screen of the electronic device based on the render structure includes decoding, by the display layer interpreter the render structure to extract display layers and the render commands. Further, the method includes converting, by the display layer interpreter, the display layers into individual layers, where each of the layers is maintained in sync with the server. Furthermore, the method includes issuing, by a display command generator, a draw commands as the render commands to paint the layers to render the web content on the electronic device.

In an embodiment, causing, by the content renderer, to render the web content on the screen of the electronic device based on the render structure includes decoding, by a render structure interpreter, the render structure to extract the composite layer and the render commands, where the composite layer comprises display layers and composite layers received from the server. Further, the method includes converting, by the render structure interpreter, the composite layer into individual layers, where each of the layers are maintained in sync with the server. Furthermore, the method includes issuing, by the render structure interpreter, the draw commands as the render commands to paint the layers to render the web content on the electronic device.

In an embodiment, where causing, by the content renderer, to render the web content on the screen of the electronic device based on the render structure includes decoding, by the display command interpreter, the render structure to extract the composite layer and the render commands, where the composite layer comprises display layers and composite layers received from the server. Further, converting, by the display command interpreter, the composite layer into individual layers, where each of the layers is maintained in sync with the server. Further, generating, by the display command interpreter, instructions to render the web content on the electronic device. Furthermore, issuing, by the display command interpreter, the display commands as the render commands to paint the layers to render the web content on the electronic device.

Unlike the systems and methods of the related art, the proposed method provides a mechanism to cause rendering of the web content. The proposed mechanism provides a hybrid mechanism for rendering the web content. Further, the proposed method provides enhanced web browser rendering by distributing the rendering process over the server and the electronic device thereon improving the rendering quality of the web content.

Referring now to the drawings, and more particularly to FIGS. 1 to 5, 6A to 6C, 7, 8A to 8C, 9A to 9D, and 10, where similar reference characters denote corresponding features consistently throughout the figures, there are shown preferred embodiments.

FIG. 1 illustrates a system to cause rendering of web content according to an embodiment of the present disclosure.

Referring to FIG. 1, in an embodiment, a system 100 includes a server 102 and an electronic device 104. The server 102 includes a content renderer 102a and a controller unit 102b communicatively coupled to the content renderer 102a, a communication unit 102c, and a storage unit 102d.

The content renderer 102a receives the web browser details (for ex., uniform resource locator (URL), uniform resource identifier (URI), or the like) associated with the web browser application of the electronic device 104. The content renderer 102a generates a corresponding render structure for the received web details. The content renderer 102a includes draw commands that can be issued to each layer of a rendering engine associated with the server 102 to render the generated render structure on to the electronic device 104.

The electronic device 104 includes a content renderer 104a and a controller unit 104b communicatively coupled to the content renderer 104a, a communication unit 104c and a memory 104d. The electronic device 104 can be for e.g., data processing device, internet of things (IoT) devices, and a mobile device such as a smart phone, personal digital assistant (PDA), or the like.

The content renderer 104a receives the corresponding render structure generated by the server 102. The content renderer 104a includes the render commands that can be issued to each layer of a rendering engine associated with the electronic device 104 to render the received render structure on to the screen of the electronic device 104.

Unlike the mechanism of the related art, the rendering architecture of the server 102 and the rendering architecture of the electronic device 104 includes the content renderer 102a and the content renderer 104a (without disturbing the architecture of the related art) associated therewith as illustrated in FIG. 1. Further, the rendering mechanism can be distributed between the server 102 and the electronic device 104. In an example, initially, part of the rendering mechanism can be performed by the server 102 and then distributed to the electronic device 104 to process the remaining rendering mechanism. As a result of the distributed rendering mechanism between the server 102 and the electronic device 104 the quality of the rendered web content can be significantly improved. Further, the pixel-pixel rendering of the web content is identical though the rendering is executed by the content renderer 102a of the server 102.

Further, the memory 102d may include one or more computer-readable storage media. The memory 102d may include non-volatile storage elements. Examples of such non-volatile storage elements may include magnetic hard discs, optical discs, floppy discs, flash memories, or forms of electrically programmable read only memories (EPROMs) or electrically erasable and programmable ROMs (EE-PROMs). In addition, the memory 102d may, in some examples, be considered a non-transitory storage medium. The term "non-transitory" may indicate that the storage medium is not embodied in a carrier wave or a propagated signal. However, the term "non-transitory" should not be interpreted that the memory 102d is non-movable. In some examples, the memory 102d can be configured to store larger amounts of information than the memory. In certain examples, a non-transitory storage medium may store data that can, over time, change (e.g., in random access memory (RAM) or cache). The communication unit 102c can be configured for communicating internally between the units and externally with the networks.

FIG. 1 shows the system 100 but it is to be understood that other embodiments are not limited thereon. In other embodiments, the system 100 may include less or more number of components. Further, the labels or names of the components are used only for illustrative purpose and does not limit the scope of the present disclosure. One or more components can be combined together to perform same or substantially similar function in the system 100.

Figure 2:
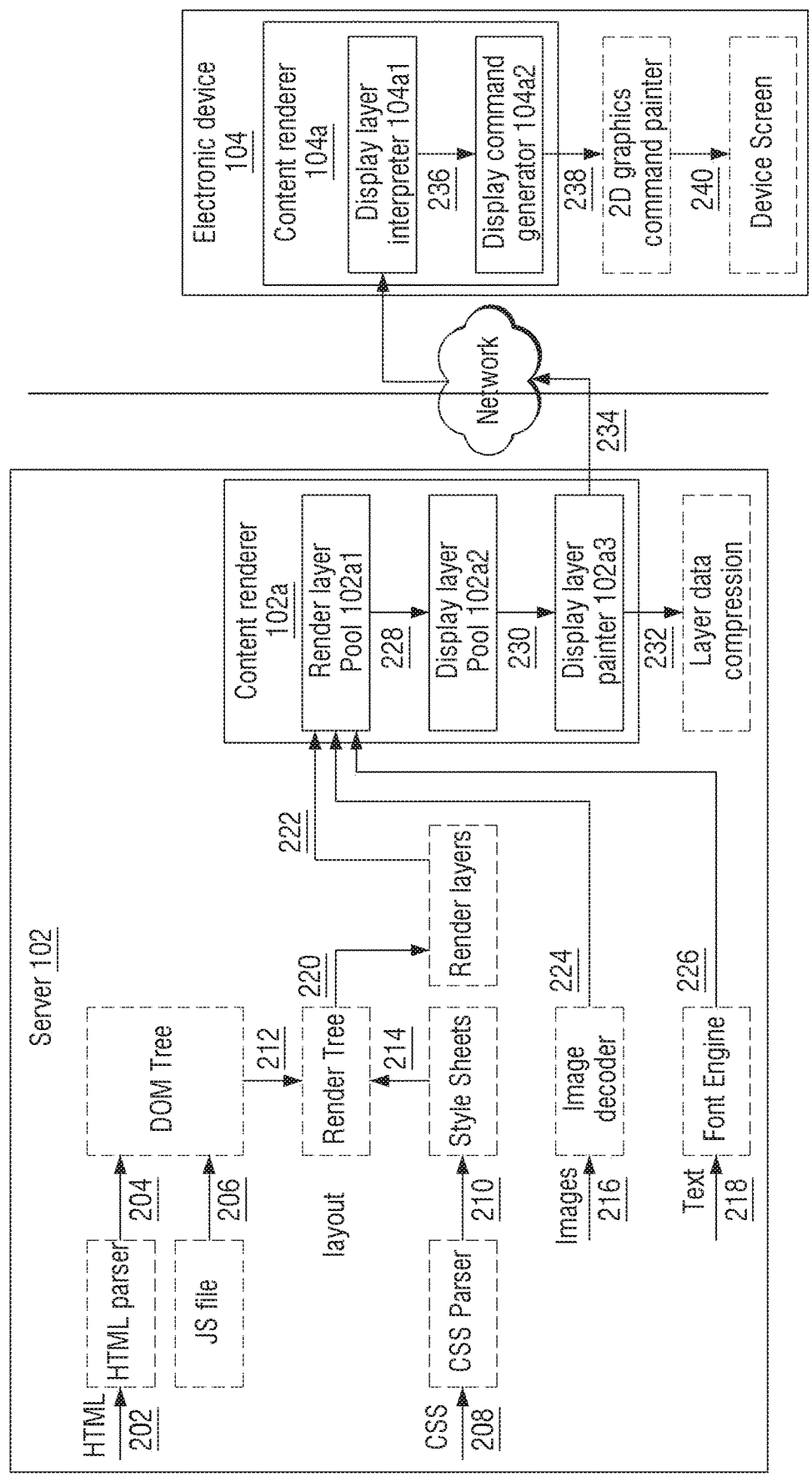
FIG. 2 illustrates a block diagram of a system to cause rendering of web content according to an embodiment of the present disclosure.

FIG. 2 illustrates a block diagram of a system to cause rendering of web content according to an embodiment as disclosed herein.

Referring to FIG. 2, in an embodiment a content renderer 102a includes a render layer pool 102a1, a display layer pool 102a2, and a display layer painter 102a3. A content renderer 104a includes a display layer interpreter 104a1 and a display command generator 104a2.

In an embodiment, the rendering engine associated with the server 102 receives the web content details associated with the electronic device 104 (i.e. the details associated with the web browser). The web content details can be the HTML file, the CSS file, the images, the text or the like.

At operation 202, the hypertext transfer protocol (HTTP) file associated with the web content is received by the HTML parser. Further, the string of symbols, words, phrases associated with the received HTML file is analyzed through the HTML parser and is tokenized.

At operation 204, the HTML file parsed by the HTML parser is sent to the DOM tree. The DOM tree is created to store node information of the web content corresponding to the received HTML file.

At operation 206, the string of symbols, words, phrases associated with the received the JS file are parsed and compiled (i.e., just-in-time (JIT) compiled) through a JS interpreter. Further the JS file is sent to the DOM tree, where the DOM tree is created to store node information of the web content corresponding to the received JS file.

At operation 208, the string of symbols, words, phrases associated with the received CSS file is analyzed through a CSS parser.

At operation 210, a CSS style sheets are created for the nodes for which the styles are mentioned.

At operation 212 and 214, a render tree is created from the DOM tree and the CSS style sheets for all visible nodes. For each of these nodes, appropriate matching CSS tree rules get multiplied.

At operation 216, the web image resources associated with the web content are sent to an image decoder, where the web image resources are decoded thereof.

At operation 218, the text associated with the web content is sent to a font engine associated with the rendering engine of the server 102. The font engine thus processes the received text.

At operation 220, a render layer is created, the render layer includes one or more layers associated therewith. These render layers can include for e.g., the render tree, the DOM tree, the CSS tree and the decoded image. Further, the render layer associated with the web content is rendered onto the screen of electronic device 104.

At operations 222, 224 and 226, the render layers, the image decoded from the image decoder and the text from the font engine are sent to the render layer pool 102a1. Thus, the render layer pool 102a1 can maintain the render tree structure for each layer created from its corresponding DOM tree. Further, the render layer pool 102a1 can clone all the layers of the rendering engine associated with the server 102, into the common data structure. The layers can include, for e.g., CSS animations, CSS transform, canvas, web graphical user interface (webGUI), accelerate CSS filters or the like.

At operation 228, the display layer pool 102a2 holds a virtual backup for each render layer and maintains a display layer for each of the render layers cloned at the render layer pool 102a1. Further, the display layer pool 102a2 maintains backup of all the layers maintained by the render layer pool 102a1. Furthermore, the display layer pool 102a2 aids in maintaining all the animated layers that can be used by the electronic device 104 to animate the web content.

At operation 230, the display layer painter 102a3 virtually paints each display layer maintained by the display layer pool 102a2. The drawing commands issued to paint each of the display layers by the rendering engine, associated with the server 104, are maintained in a data structure, which can be used by the electronic device 104 to paint the actual web content on the screen.

At operation 232, the data structure is sent to a layer data compression associated with the electronic device 104. The display layer from the display layer painter 102a3 is therefore compressed in the layer data compression, which can be used by the electronic device 104.

In an embodiment, the content renderer 104a is very light module which runs on the electronic device 104. The content renderer 104a clones all the render layers and display layers received from the content renderer 102a. Each layer is painted and composited as per the data structure sent from display layer painter 102a3.

At operation 234, the pool of display layers from the display layer painter 102a3 are sent to the display layer interpreter 104a1 associated with the content renderer 104a of the electronic device 104. The display layers are further converted into an individual layers and are kept in sync with the content renderer 102a of the server 102. Once all the individual layers are decoded the display layer interpreter 104a1 triggers the display command generator 104a2 to decode the paint commands for each layer associated with the individual layers.

At operation 236, the draw commands (e.g., as the rendering commands) associated with each layer is decoded and kept ready for composition on to the screen of the electronic device 104. All the information like z-order, animation time, draw time is maintained by the display command generator 104a2.

At operation 238, the display command generator 104a2 communicates with graphics command painter module to paint all the draw commands (e.g., as the rendering commands).

At operation 240, the draw commands are sent to the screen, where the screen associated with the electronic device 104 displays the web content thereof.

For example, consider a scenario where the electronic device 104 requests to access the web content through the web browser application associated with the electronic device 104. The web content details are sent to the web rendering engine associated with the server 102 (for e.g., server of the web browser interconnected to the electronic device 104). The web rendering engine associated with the content renderer 102a thereby processes the requests by executing the aforementioned operations 202 to 232. As a result, the content renderer 104a, by executing the operations 236 to 240 associated with the electronic device 104, consumes less bandwidth, memory and power. Further, the quality of the rendering is similar to the rendering engine associated with the electronic device 104.

Figure 3:
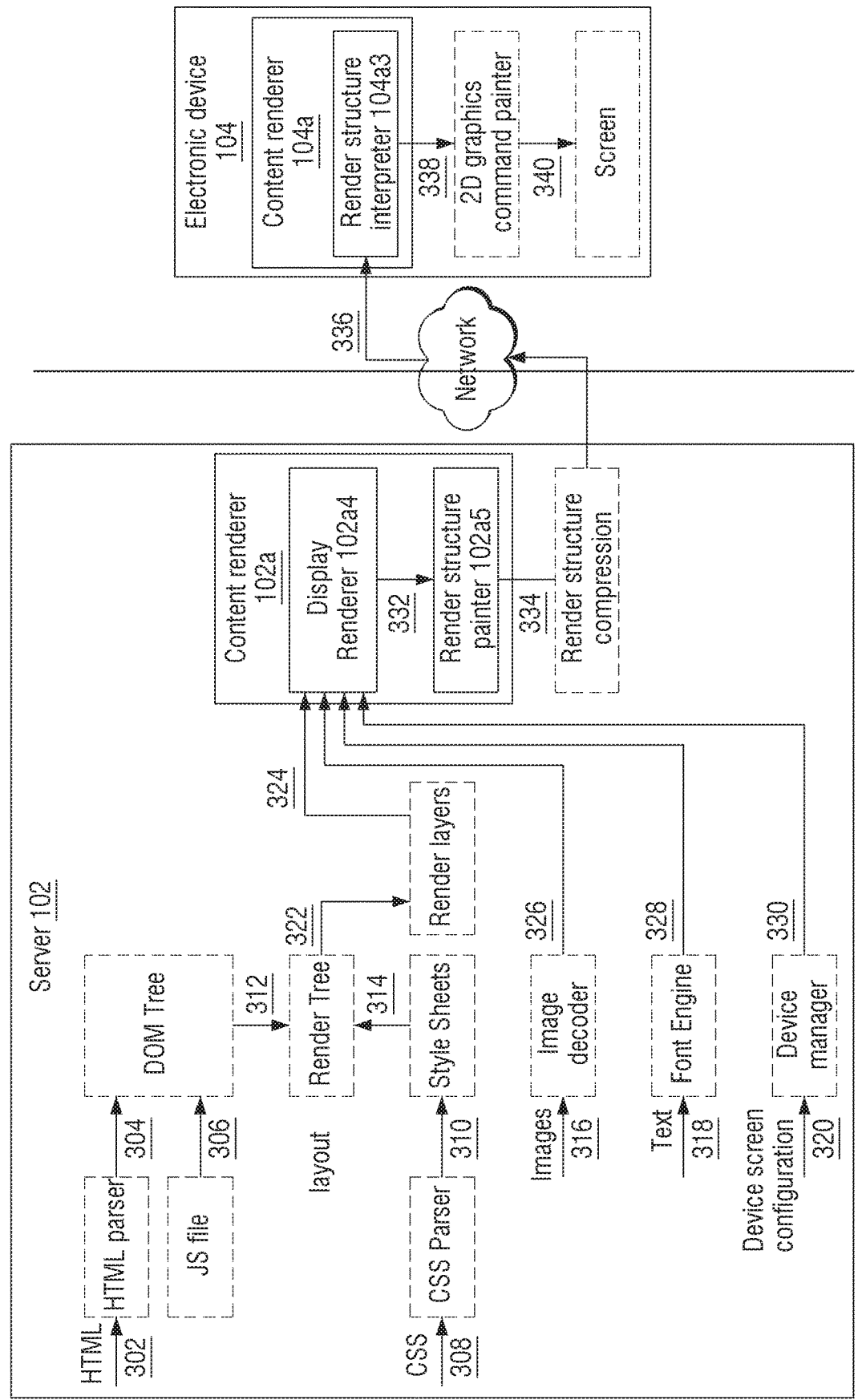
FIG. 3 illustrates another block diagram of a system to cause rendering of web content according to an embodiment of the present disclosure.

FIG. 3 illustrates another block diagram of as system to cause rendering of web content according to an embodiment as disclosed herein.

Referring to FIG. 3, in an embodiment, a content renderer 102a includes a display renderer 102a4 and a render structure painter 102a5. A content renderer 104a includes a render structure interpreter 104a3.

In an embodiment, the rendering engine associated with the server 102 receives the web content details associated with the electronic device 104 (i.e. the details associated with the web browser). The web content details can be the HTML file, the CSS file, the images, the text or the like.

At operation 302, the HTTP file associated with the web content is received by the HTML parser. Further, the string of symbols, words, phrases associated with the received HTML file is analyzed through the HTML parser and is tokenized.

At operation 304, the HTML file parsed by the HTML parser is sent to the DOM tree. The DOM tree is created to store node information of the web content corresponding to the received HTML file.

At operation 306, the string of symbols, words, phrases associated with the received JS file is parser and compiled (i.e., JIT compiled) through the JS interpreter. Further the JS file is sent to the DOM tree, where the DOM tree is created to store node information of the web content corresponding to the received JS file.

At operation 308, the string of symbols, words, phrases associated with the received CSS file is analyzed through the CSS parser.

At operation 310, the CSS style sheets are created for the nodes for which the styles are mentioned.

At operations 312 and 314, the render tree is created from the DOM tree and the CSS style sheets for all visible nodes. For each of these nodes, appropriate matching CSS tree rules get multiplied.

At operation 316, the web image resources associated with the web content are sent to the image decoder, where the web image resources are decoded thereof.

At operation 318, the text associated with the web content is sent to the font engine associated with the rendering engine of the server 102. The font engine thus processes the received text.

At operation 320, the device manager associated with the server 102 configures the screen associated with the electronic device 102.

At operation 322, the render layer is created, the render layer includes one or more layers associated therewith. These render layers can include for e.g., the render tree, the DOM tree, the CSS tree, and the decoded image. Further, the render layer associated with the web content is rendered onto the screen of electronic device 104.

At operations 324, 326, 328 and 330, the render layers, the image decoded from the image decoder, the text from the font engine and the device screen configuration from the device manager are sent to the display renderer 102a4. Thus, the display renderer 102a4 merges all the received render layers into one composite layer. The display renderer 102a4 includes one layer and all the draw commands are executed into this single layer.

At operation 332, the composite layer from the display renderer 102a4 are sent to the render structure painter 102a5. The render structure painter 102a5 maintains a draw commands in the data structure, where the draw commands are issued to paint the composite layers to render the web content on the electronic device 104. The render structure, from the render structure painter 102a5, can be stored by the server 102 for providing quick response to other electronic device(s) which are requesting the same web content.

At operation 334, the render structure from the render structure painter 102a5 is therefore sent to the render structure compression where the render structure is compressed and sent to the electronic device 104 at operation 336.

At operation 338, the render structure interpreter 104a3 decodes the render structure received from the server 102. Further, the render structure interpreter 104a3 issues a draw commands, as the render commands, using graphics command painter module (for e.g., 2D graphics command painter), associated with the electronic device 104. The received file can be stored for offline browsing by the electronic device 104.

At operation 340, the draw commands are sent to the screen, where the screen associated with the electronic device 104 displays the web content thereof.

Figure 4:
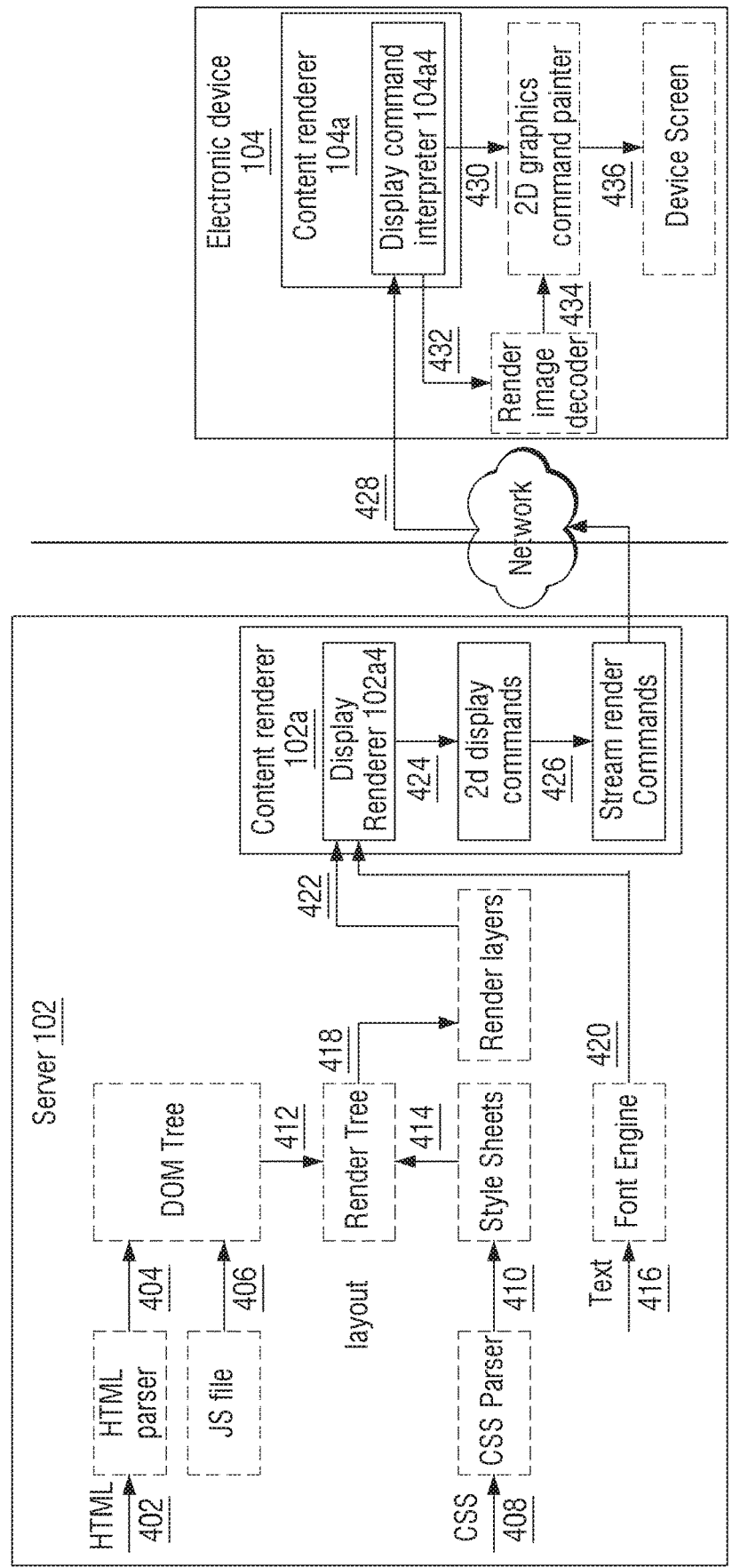
FIG. 4 illustrates another block diagram of a system to cause rendering of web content according to an embodiment of the present disclosure.

FIG. 4 illustrates another block diagram of a system to cause rendering of web content according to an embodiment as disclosed herein.

Referring to FIG. 4, in an embodiment, a content render 104a includes a display command interpreter 104a4.

In an embodiment, the rendering engine associated with a server 102 receives the web content details associated with an electronic device 104 (i.e. the details associated with the web browser). The web content details can be the HTML file, the CSS file, the images, the text or the like.

At operation 402, the HTTP file associated with the web content is received by the HTML parser. Further, the string of symbols, words, phrases associated with the received HTML file is analyzed through the HTML parser and is tokenized.

At operation 404, the HTML file parsed by the HTML parser is sent to the DOM tree. The DOM tree is created to store node information of the web content corresponding to the received HTML file.

At operation 406, the string of symbols, words, phrases associated with the received JS file is parser and compiled (i.e., JIT compiled) through the JS interpreter. Further the JS file is sent to the DOM tree, where the DOM tree is created to store node information of the web content corresponding to the received JS file.

At operation 408, the string of symbols, words, phrases associated with the received CSS file is analyzed through the CSS parser.

At operation 410, the CSS style sheets are created for the nodes for which the styles are mentioned.

At operations 412 and 414, the render tree is created from the DOM tree and the CSS style sheets for all visible nodes. For each of these nodes, appropriate matching CSS tree rule gets multiplied.

At operation 416, the text associated with the web content is sent to the font engine associated with the rendering engine of the server 102. The font engine thus processes the received text.

At operation 418, the render layer is created, the render layer includes one or more layers associated therewith. These render layers can include for e.g., the render tree, the DOM tree, the CSS tree, and the decoded image. Further, the render layer associated with the web content is rendered onto the screen of electronic device 104.

At operations 420 and 422, the render layers and the text from the font engine are sent to the display renderer 102a4. Thus, the display renderer 102a4 merges all the received render layers into one composite layer. The display renderer 102a4 includes one layer and all the draw commands are executed into this single layer. The display render 102a4 generates instructions to render the web content on to the device screen, associated with the electronic device 104, along with content and properties. Further, the display render 102a4 captures the web image information separately from the web content to leave image decoding operation to the electronic device 104 (web details associated with the web browser)

In an embodiment, at operation 424, the display renderer 102a4 generates the display commands, which are used by the electronic device 104.

At operation 426, the generated display commands are used to generate the draw commands.

At operation 428, the display render 102a4 sends all the instructions (content, image, draw commands), through the stream render commands, to the display command interpreter 104a4 of the electronic device 104. The display command interpreter 104a4 can decode the display commands received from the server 102.

At operation 430, the display command interpreter 104a4 issues the draw commands to the graphics command painter module of the electronic device 104.

At operation 432, the images can be decoded by the server 102 using the render image decoder module. Further, at operation 434 the decoded images are sent to the graphics command painter module to display the images.

At operation 436, the decoded images from the graphics command painter module are sent to the screen associated with the electronic device 104 to display the web content.

Figure 5:
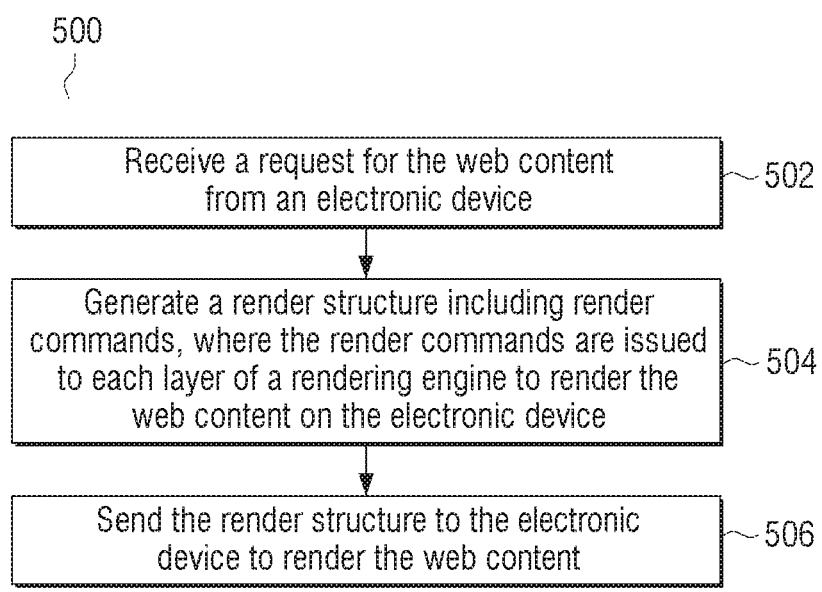
FIG. 5 is a flow diagram that illustrates a method to cause rendering of web content through a server according to an embodiment of the present disclosure.

FIG. 5 is a flow diagram that illustrates a method to cause rendering of the web content through the server according to an embodiment of the present disclosure.

Referring to FIG. 5, at operation 502, a method 500 includes receiving the request for the web content from an electronic device 104. In an embodiment, the method 500 allows a controller unit 102*b* to receive the request for the web content from an electronic device 104.

At operation 504, the method 500 includes generating the render structure including the render commands, where the render commands are issued to each layer of the rendering engine to render the web content on the electronic device 104. In an embodiment, the method 500 allows the controller unit 102*b* to generate render structure including the render commands, where the render commands are issued to each layer of the rendering engine to render the web content on the electronic device 104. In an embodiment, the generation of the render structure is explained in conjunction with FIG. 6A to 6C as described below.

At operation 506, the method 500 includes sending the render structure to the electronic device 104 to render the web content. In an embodiment, the method 500 allows the controller unit 102*b* to send the render structure to the electronic device 104 to render the web content.

The various actions, acts, blocks, operations, or the like in the method 500 may be performed in the order presented, in a different order or simultaneously. Further, in some embodiments, some of the actions, acts, blocks, operations, or the like may be omitted, added, modified, skipped, or the like without departing from the scope of the present disclosure.

Figure 6A:
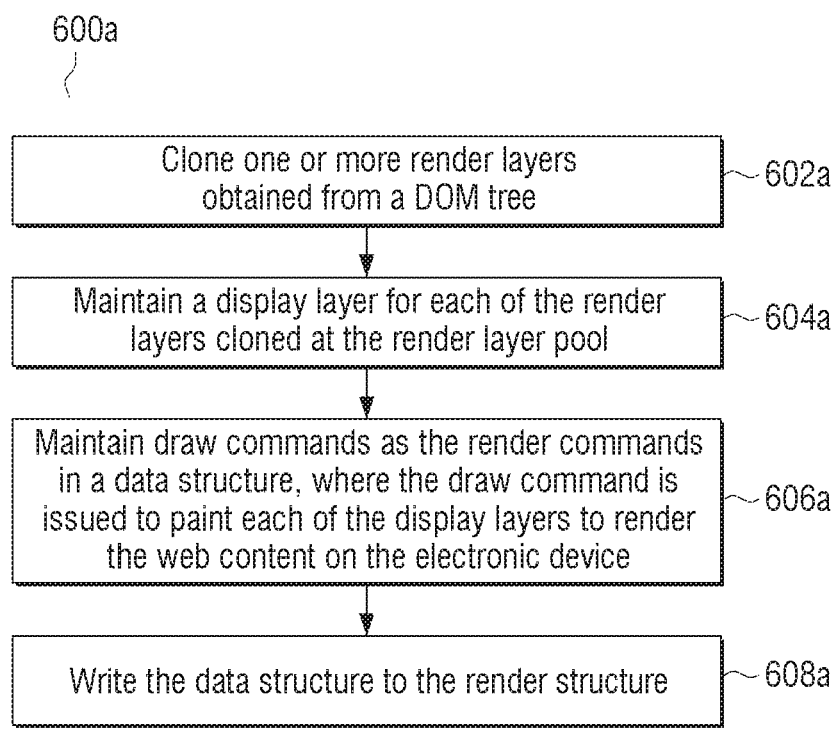
FIG. 6A to 6C are flow diagrams illustrating a method for generating a render structure including draw commands according to various embodiments of the present disclosure.
Figure 6B:
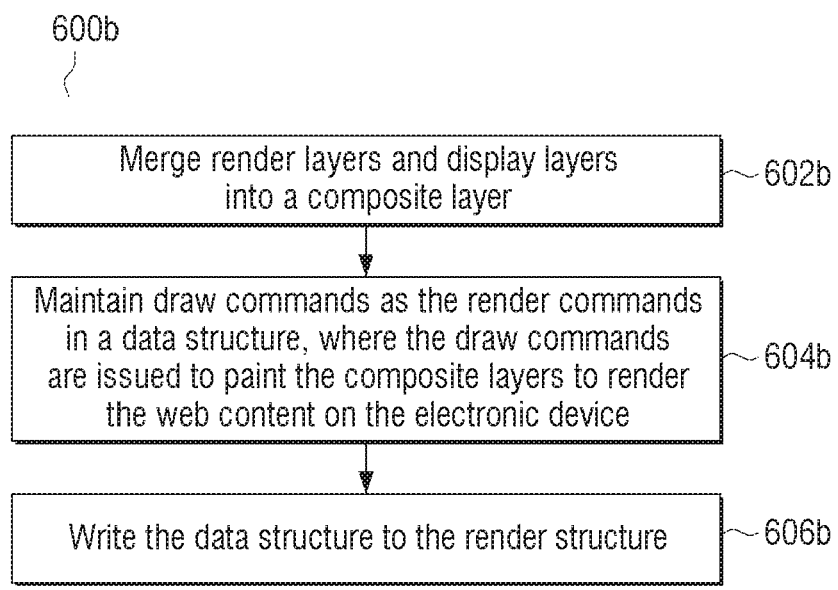
Figure 6C:
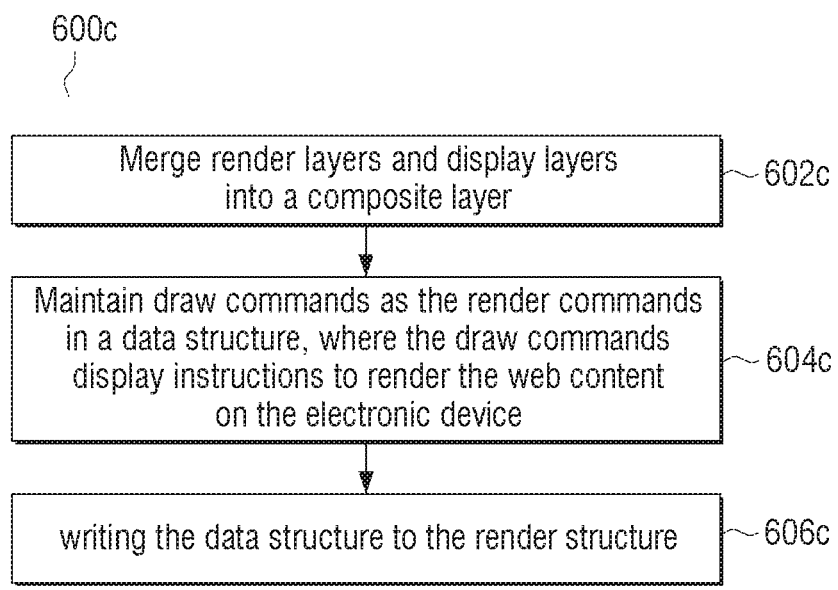

FIGS. 6A to 6C are flow diagrams illustrating a method for generating a render structure including draw commands according to various embodiments of the present disclosure.

Referring to FIG. 6A, a method 600*a* associated with a content renderer 102*a* includes a render layer pool 102*a*1, a display layer pool 102*a*2, and a display layer painter 102*a*3. At operation 602*a*, the method 600*a* includes cloning the one or more render layers obtained from the DOM tree. In an embodiment, the method 600*a* allows a controller unit 102*b* to perform the cloning of one or more render layers obtained from a DOM tree.

At operation 604*a*, the method 600*a* includes maintaining the display layer for each of the render layers cloned at the render layer pool 102*a*1. In an embodiment, the method 600*a* allows the controller unit 102*b* to maintain the display layer for each of the render layers cloned at the render layer pool 102*a*1.

At operation 606*a*, the method 600*a* includes maintaining the draw commands in the data structure, where the draw commands are issued to paint each of the display layers to render the web content on the electronic device 104. In an embodiment, the method 600*a* allows the controller unit 102*b* to maintain the draw commands as the render commands in the data structure, where the draw commands are issued to paint each of the display layers to render the web content on the electronic device 104.

At operation 608*a*, the method 600*a* includes writing the data structure to the render structure. In an embodiment, the method 600*a* allows the controller unit 102*b* to write the data structure to the render structure.

The various actions, acts, blocks, operations, or the like in the method 600*a* may be performed in the order presented, in a different order or simultaneously. Further, in some embodiments, some of the actions, acts, blocks, operations, or the like may be omitted, added, modified, skipped, or the like without departing from the scope of the present disclosure.

FIG. 6B is a flow diagram illustrating a method for generating a render structure including render commands according to an embodiment of the present disclosure.

Referring to FIG. 6B, a method 600*b* associated with a content renderer 102*a* includes, according to an embodiment as disclosed herein. In an embodiment the content renderer 102*a* includes a display renderer 102*a*4 and a render structure painter 102*a*5.

At operation 602*b*, the method 600*b* includes merging the render layers and display layers into the composite layer. In an embodiment, the method 600*b* allows the controller unit 102*b* to merge the render layers and display layers into the composite layer.

At operation 604*b*, the method 600*b* includes maintaining the draw commands as the render commands in the data structure, where the draw commands are issued to paint the composite layers to render the web content on the electronic device 104. In an embodiment, the method 600*b* allows the controller unit 102*b* to maintain the draw commands as the render commands in the data structure, where the draw commands are issued to paint the composite layers to render the web content on the electronic device 104.

At operation 606*b*, the method 600*b* includes writing the data structure to the render structure. In an embodiment, the method 600*b* allows the controller unit 102*b* to write the data structure to the render structure.

The various actions, acts, blocks, operations, or the like in the method 600*b* may be performed in the order presented, in a different order or simultaneously. Further, in some embodiments, some of the actions, acts, blocks, operations, or the like may be omitted, added, modified, skipped, or the like without departing from the scope of the present disclosure.

FIG. 6C is a flow diagram illustrating a method for generating a render stream including render commands according to an embodiment of the present disclosure.

Referring to FIG. 6C, a method 600*c* associated with a content renderer 102*a*, according to an embodiment as disclosed herein. In an embodiment the content renderer 102*a* includes a display renderer 102*a*4, where the display renderer 102*a*4 generates the display command and the stream render commands which can be used by an electronic device 104.

At operation 602*c*, the method 600*c* includes merging the render layers and display layers into the composite layer. In an embodiment, the method 600*c* allows the controller unit 102*b* to merge the render layers and display layers into the composite layer.

At operation 604*c*, the method 600*c* includes generating the draw commands as the render commands in the data structure, where the draw commands display instructions to render the web content on the electronic device 104. In an embodiment, the method 600*c* allows the controller unit 102*b* to generate the draw commands as the render commands in the data structure, where the draw commands display instructions to render the web content on the electronic device 104.

At operation 606*c*, the method 600*c* writing the data structure to the render stream. In an embodiment, the method 600*c* allows the controller unit 102*b* to write the data structure to the render stream.

The various actions, acts, blocks, operations, or the like in the method 600*c* may be performed in the order presented, in a different order or simultaneously. Further, in some embodiments, some of the actions, acts, blocks, operations, or the like may be omitted, added, modified, skipped, or the like without departing from the scope of the present disclosure.

Figure 7:
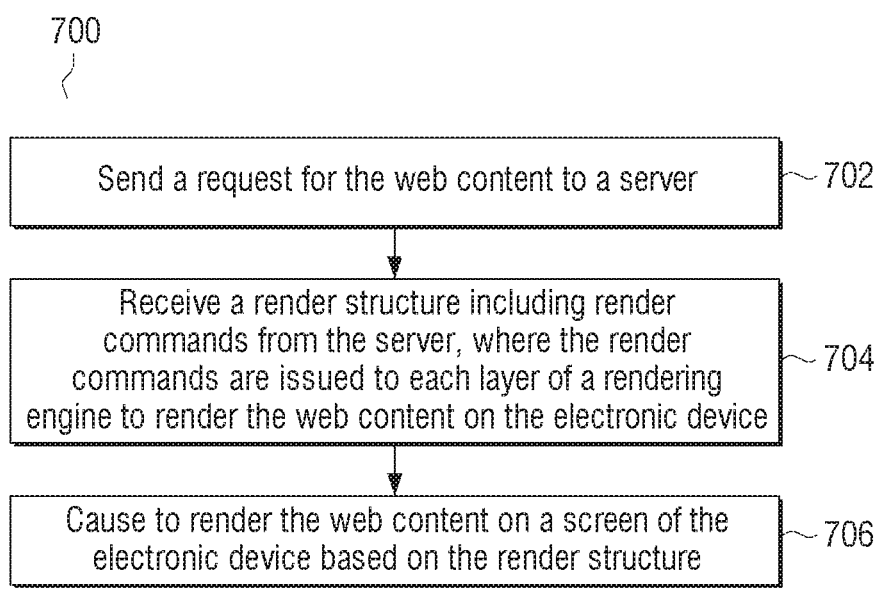
FIG. 7 is a flow diagram illustrating a method to cause rendering of web content through a server according to an embodiment of the present disclosure.

FIG. 7 is a flow diagram illustrating a method to cause rendering of web content through a server according to an embodiment of the present disclosure.

Referring to FIG. 7, at operation 702, a method 700 includes sending a request for web content to a server 102. In an embodiment, the method 700 allows a controller unit 104b to send the request for the web content to the server 102.

At operation 704, the method 700 includes receiving the render structure including the render commands from the server 102, where the render commands are issued to each layer of a rendering engine to render the web content on the electronic device 104. In an embodiment, the method 700 allows the controller unit 104b to receive the render structure including the render commands from the server 102, where the render commands are issued to each layer of a rendering engine to render the web content on the electronic device 104.

At operation 706, the method 700 includes causing to render the web content on the device screen of the electronic device 104 based on the render structure. In an embodiment, the method 700 allows the controller unit 104b to cause the web content to render on the screen of the electronic device 104 based on the render structure. In an embodiment, causing to render the web content on the screen of the electronic device 104 based on the render structure is explained in conjunction with FIG. 8A to 8C as described below.

The various actions, acts, blocks, operations, or the like in the method 700 may be performed in the order presented, in a different order or simultaneously. Further, in some embodiments, some of the actions, acts, blocks, operations, or the like may be omitted, added, modified, skipped, or the like without departing from the scope of the present disclosure.

Figure 8A:
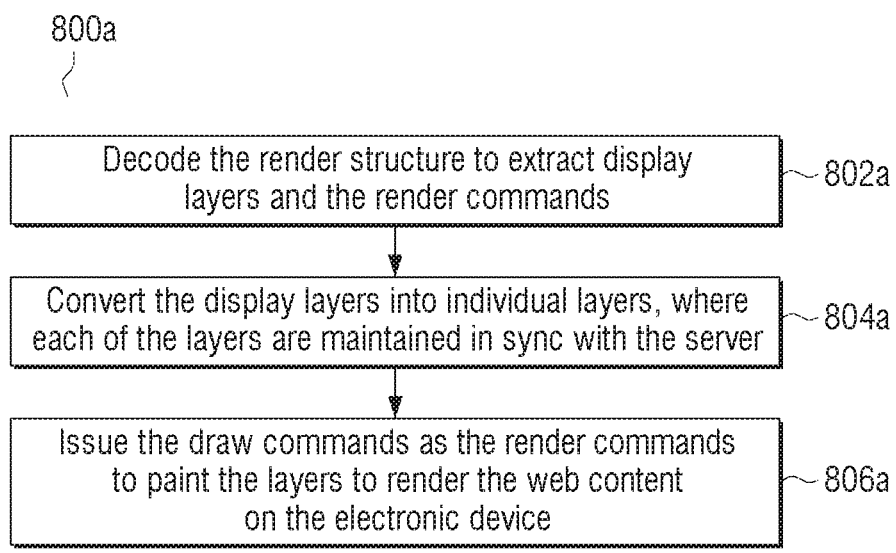
FIG. 8A to 8C are flow diagrams illustrating a method to cause rendering of web content through an electronic device according to various embodiments of the present disclosure.
Figure 8B:
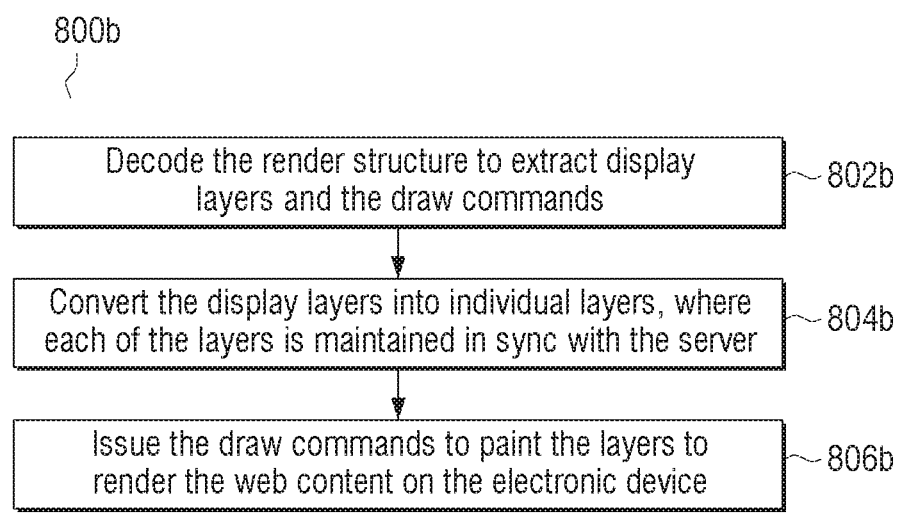
Figure 8C:
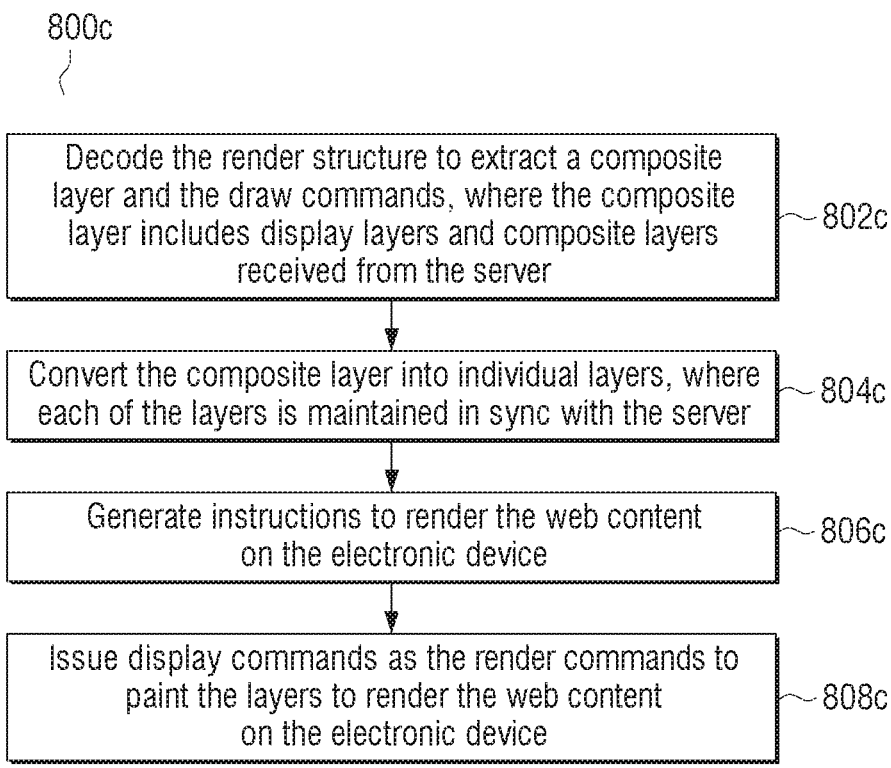

FIG. 8A to 8C are flow diagrams illustrating a method to cause rendering of web content through an electronic device according to various embodiments of the present disclosure.

Referring to FIG. 8A, in an embodiment a method 800a associated with a content renderer 104a includes a display layer interpreter 104a1 and a display command generator 104a2.

At operation 802a, the method 800a includes decoding the render structure to extract the display layers and the render commands received from the server 102. In an embodiment, the method 800a allows the controller unit 104b to perform the decoding of the render structure to extract the display layers and the render commands received from the server 102.

At operation 804a, the method 800a includes converting the display layers into individual layers, where each of the layers is maintained in sync with the server 102. In an embodiment, the method 800a allows the controller unit 104b to convert the display layers into individual layers, where each of the layers is maintained in sync with the server 102.

At operation 806a, the method 800a includes issuing a draw commands as the render commands to paint the layers to render the web content on the electronic device 104. In an embodiment, the method 800a allows the controller unit 104b to issue the draw commands to paint the layers to render the web content on the electronic device 104.

The various actions, acts, blocks, operations, or the like in the method 800a may be performed in the order presented, in a different order or simultaneously. Further, in some embodiments, some of the actions, acts, blocks, operations, or the like may be omitted, added, modified, skipped, or the like without departing from the scope of the present disclosure.

FIG. 8B is a flow diagram illustrating a method to causing rendering of web content on a screen of an electronic device based on a render structure according to an embodiment of the present disclosure.

Referring to FIG. 8B, in an embodiment a method 800b associated with a content renderer 104a includes a render structure interpreter 104a3.

At operation 802b, the method 800b includes decoding the render structure to extract the display layers and the render commands. In an embodiment, the method 800b allows the controller unit 104b to perform the decoding of the render structure to extract the display layers and the render commands.

At operation 804b, the method 800b includes converting the display layers into individual layers, where each of the layers is maintained in sync with the server 102. In an embodiment, the method 800b allows the controller unit 104b to convert the display layers into individual layers, where each of the layers is maintained in sync with the server 102.

At operation 806b, the method 800b includes issuing the draw commands to paint the layers to render the web content on the electronic device 104. In an embodiment, the method 800b allows the controller unit 104b to issue the draw commands as the render commands to paint the layers to render the web content on the electronic device 104.

The various actions, acts, blocks, operations, or the like in the method 800b may be performed in the order presented, in a different order or simultaneously. Further, in some embodiments, some of the actions, acts, blocks, operations, or the like may be omitted, added, modified, skipped, or the like without departing from the scope of the present disclosure.

FIG. 8C is a flow diagram illustrating a method to cause rendering of web content on a screen of an electronic device based on a render stream according to an embodiment of the present disclosure.

Referring to FIG. 8C, in an embodiment a method 800a associated with a content renderer 104a includes a display command interpreter 104a4.

At operation 802c, the method 800c includes decoding the render stream to extract the composite layer and the render commands, where the composite layer includes the display layers and the composite layers received from the server 102. In an embodiment, the method 800c allows the controller unit 104b to perform the decoding of the render stream to extract the composite layer and the render commands, where the composite layer includes the display layers and the composite layers received from the server 102.

At operation 804c, the method 800c includes converting the composite layer into individual layers, where each of the layers is maintained in sync with the server 102. In an embodiment, the method 800c allows the controller unit 104b to convert the composite layer into individual layers, where each of the layers is maintained in sync with the server 102.

At operation 806c, the method 800c includes generating instructions to render the web content on the electronic device 104. In an embodiment, the method 800c allows the controller unit 104b to generate instructions to render the web content on the electronic device 104.

At operation 808*c*, the method 800*c* includes issuing a display commands as the render commands to paint the layers to render the web content on the electronic device 104. In an embodiment, the method 800*c* allows the controller unit 104*b* to issue the display commands as the render commands to paint the layers to render the web content on the electronic device 104.

The various actions, acts, blocks, operations, or the like in the method 800*c* may be performed in the order presented, in a different order or simultaneously. Further, in some embodiments, some of the actions, acts, blocks, operations, or the like may be omitted, added, modified, skipped, or the like without departing from the scope of the present disclosure.

Figure 9A:
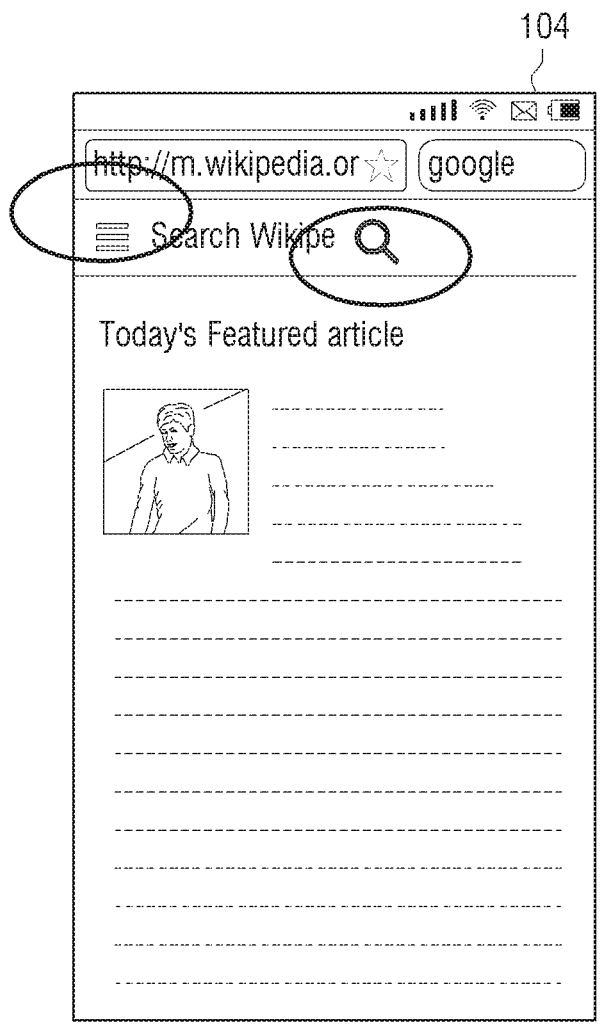
FIG. 9A to 9D illustrate embodiments for a method to cause rendering of web content according to various embodiments of the present disclosure.
Figure 9B:

In an embodiment, for example, the web browser rendering details associated with the server 102 are sent to the electronic device 104, the render layers and the display layers are decoded and painted on the device screen by the electronic device 104 for enhanced rendering quality and user interaction features as shown in FIG. 9A to 9B.

FIG. 9A to 9D illustrate embodiments for a method to cause rendering of web content according to various embodiments of the present disclosure.

Figure 9C:
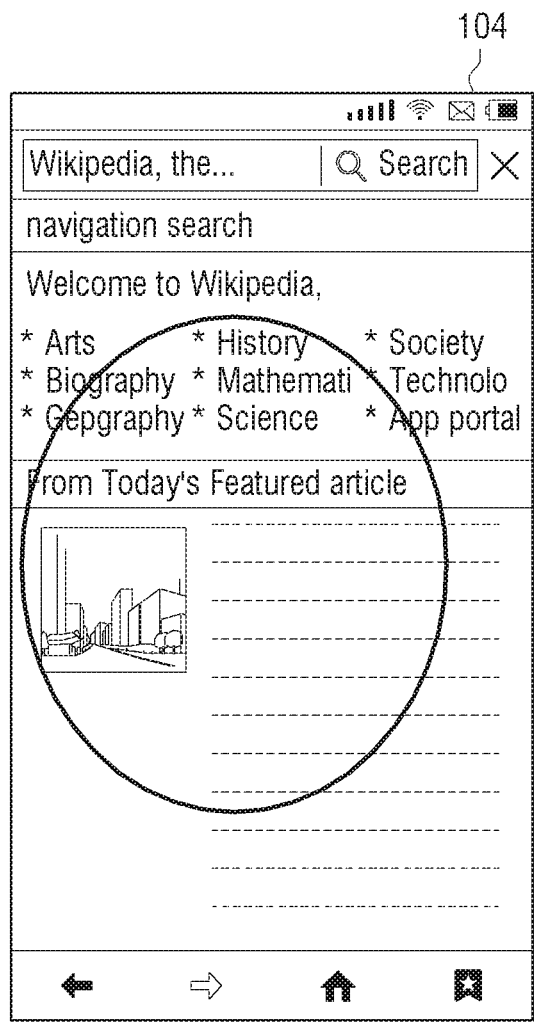
Figure 9D:
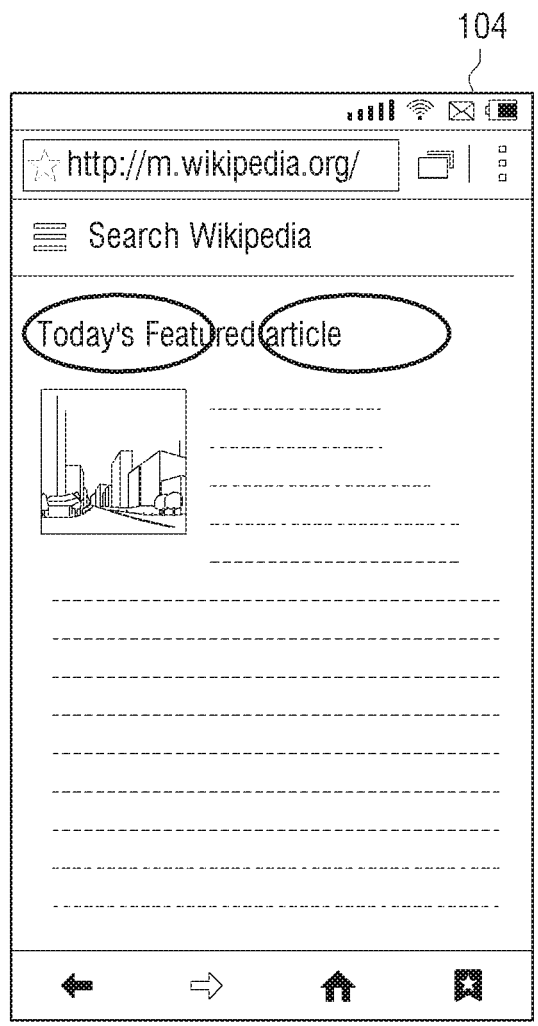

Referring to FIGS. 9C and 9D, in an embodiment, an electronic device 104 decodes rendered data and pastes it on a device screen based on a browser interface. Since pasting of the rendered data is processed by the electronic device 104, the rendering quality is better. As a result, browser data associated with the electronic device 104 and the rendered data, from the server 102, is identical.

Further, the rendering data (i.e. pasting of rendered data) is processed by the electronic device 104, there is no delay in loading the web content for features such as zoom, flick, scroll, or the like.

Figure 10:
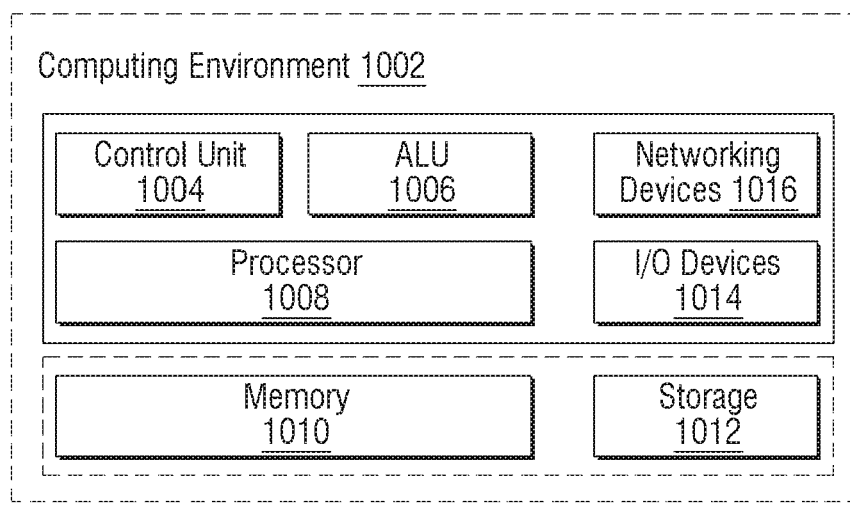
FIG. 10 illustrates a computing environment implementing a method to cause rendering of web content according to an embodiment of the present disclosure.

FIG. 10 illustrates a computing environment implementing a method to cause rendering of web content according to an embodiment of the present disclosure.

Referring to FIG. 10, a computing environment 1002 comprises at least one processor 1008 that is equipped with a control unit 1004 and an arithmetic logic unit (ALU) 1006, a memory 1010, a storage unit 1012, plurality of networking devices 1016 and a plurality of input output (I/O) devices 1014. The processor 1008 is responsible for processing instructions of a scheme. The processor 1008 receives commands from the control unit 1004 in order to perform its processing. Further, any logical and arithmetical operations involved in the execution of the instructions are computed with the help of the ALU 1006.

The overall computing environment 1002 can be composed of multiple homogeneous and/or heterogeneous cores, multiple central processing units (CPUs) of different kinds, special media and other accelerators. The processor 1008 is responsible for processing the instructions of the algorithm. Further, the plurality of processor 1008 may be located on a single chip or over multiple chips.

The algorithm comprising of instructions and codes required for the implementation are stored in either the memory unit 1010 or the storage 1012 or both. At the time of execution, the instructions may be fetched from the corresponding memory 1010 or storage 1012, and executed by the processing unit 1008.

In case of any hardware implementations various networking devices 1016 or external I/O devices 1014 may be connected to the computing environment to support the implementation through the networking unit and the I/O device unit.

In the meantime, the aforementioned render structure may include detailed information with respect to web content. Detailed information in relation to web content may include details relating to a web browser. For example, details relating to web browser may include an HTML, a CSS file, a JS file, an image, a text, web structure information, format information, or the like. The content renderer 102*a* of the server 102 may receive detailed information relating to web content and generate a corresponding render structure. As described above, as an embodiment, the display layer pool 102*a*2 holds a virtual backup for each render layer and maintains a display layer for each of the render layers cloned at the render layer pool 102*a*1. Further, the display layer pool 102*a*2 maintains backup of all the layers maintained by the render layer pool 102*a*1. Furthermore, the display layer pool 102*a*2 aids in maintaining all the animated layers that can be used by the electronic device 104 to animate the web content.

The display layer painter 102*a*3 virtually paints the each display layer maintained by the display layer pool 102*a*2. The drawing commands issued to paint each of the display layers by the rendering engine, associated with the server 104, are maintained in a data structure, which can be used by the electronic device 104 to paint the actual web content on the screen.

The data structure is sent to a layer data compression associated with the electronic device 104. The display layer from the display layer painter 102*a*3 is therefore compressed in the layer data compression, which can be used by the electronic device 104.

In an embodiment, the content renderer 104*a* is very light module which runs on the electronic device 104. The content renderer 104*a* clones all the render layers and display layers received from the content renderer 102*a*. Each layer is painted and composited as per the data structure sent from display layer painter 102*a*3.

The pool of display layers from the display layer painter 102*a*3 are sent to the display layer interpreter 104*a*1 associated with the content renderer 104*a* of the electronic device 104. The display layers are further converted into an individual layers and are kept in sync with the content renderer 102*a* of the server 102. Once all the individual layers are decoded the display layer interpreter 104*a*1 triggers the display command generator 104*a*2 to decode the paint commands for the each layer associated with the individual layers.

The draw commands (e.g., as the rendering commands) associated with the each layer is decoded and kept ready for composition on to the screen of the electronic device 104. All the information like z-order, animation time, draw time is maintained by the display command generator 104*a*2.

The display command generator 104*a*2 communicates with graphics command painter module to paint all the draw commands (e.g., as the rendering commands.

As another embodiment, the composite layer from the display renderer 102*a*4 are sent to the render structure painter 102*a*5. The render structure painter 102*a*5 maintains a draw commands in the data structure, where the draw commands are issued to paint the composite layers to render the web content on the electronic device 104. The render structure, from the render structure painter 102*a*5, can be stored by the server 102 for providing quick response to other electronic device(s) which are requesting the same web content.

The render structure from the render structure painter 102a5 is therefore sent to the render structure compression where the render structure is compressed and sent to the electronic device 104.

The render structure interpreter 104a3 decodes the render structure received from the server 102. Further, the render structure interpreter 104a3 issues a draw commands, as the render commands, using graphics command painter module (for e.g., 2D graphics command painter), associated with the electronic device 104. The received file can be stored for offline browsing by the electronic device 104.

In another embodiment, the display renderer 102a4 generates the display commands, which are used by the electronic device 104.

The generated display commands are used to generate the draw commands.

The display render 102a4 sends all the instructions (content, image, draw commands); through the stream render commands, to the display command interpreter 104a4 of the electronic device 104. The display command interpreter 104a4 can decode the display commands received from the server 102.

The display command interpreter 104a4 issues the draw commands to the graphics command painter module of the electronic device 104, and the images can be decoded by the server 102 using the render image decoder module. Further, the decoded images are sent to the graphics command painter module to display the images.

In sum, the content renderer 102a of the server 102 may receive detailed information relating to web content, and convert the information to be rendered in the electronic device 104 with power lower than that used for rendering in the electronic device 104 when detailed information relating to web content is rendered in the electronic device 104. In addition, the content renderer 102a of the server 102 may transmit detailed information relating to converted web content to the electronic device 104. The content renderer 104a of the electronic device 104 may receive detailed information relating to web content converted from the server 102, and generate rendering based on detailed information relating to received web content. Therefore, the electronic device 104 may process web content in low power.

The embodiments disclosed herein can be implemented through at least one software program running on at least one hardware device and performing network management functions to control the elements. The elements shown in FIG. 1 to 10, include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a server which supports rendering of web content, the method comprising:
    receiving, by the server executing a program for rendering, a request for the web content from an electronic device;
    obtaining, by the server executing the program for rendering, a render layer and a display layer used for rendering of the web content based on information of the web content;
    obtaining, by the server executing the program for rendering, a render structure comprising render commands and detailed information of the web content, based on the render layer and the display layer;
    compressing, by the server executing the program for rendering, the render structure, the compressing of the render structure comprising:
        converting the detailed information of the web content so that power used by the electronic device for rendering the converted detailed information is less than power used by the electronic device for rendering the detailed information without the detailed information of the web content being converted; and
    sending, by the server executing the program for rendering, the compressed render structure executable on the electronic device to the electronic device,
    wherein at least one of the render layer or the display layer comprises information with respect to an action which is to be performed by the electronic device for animating the web content, and
    wherein the obtaining of the render structure comprises:
        cloning the render layer obtained from a document object model (DOM) tree by a render layer pool;
        maintaining the display layer for each of the render layer cloned at the render layer pool by a display layer pool;
        maintaining draw commands as the render commands, wherein the render commands are issued to each layer of a rendering engine to render the web content of the electronic device, by a display layer painter; and
        merging the render layer and the display layer into a composite layer by a display renderer, wherein the draw commands are maintained by a render structure painter in the composite layer as the render commands.

2. A server for assisting rendering of web content, the server comprising:
    a memory; and
    a processor coupled to the memory,
    wherein the processor is configured to execute a program for rendering to:
        receive a request for the web content from an electronic device,
        obtain a render layer and a display layer used for rendering of the web content based on information of the web content,
        obtain a render structure comprising render commands and detailed information of the web content, based on the render layer and the display layer,
        compress the render structure, the compression of the render structure comprising:
            conversion of the detailed information of the web content so that power used by the electronic device for rendering the converted detailed information is less than power used by the electronic device for rendering the detailed information without the detailed information of the web content being converted, and
        send the compressed render structure executable on the electronic device to the electronic device to render the web content,
    wherein at least one of the render layer or the display layer comprises information with respect to an action which is to be performed by the electronic device for animating the web content, and
    wherein the processor is further configured to:

clone the render layer obtained from a document object model (DOM) tree;

maintain the display layer for each of the render layer cloned at a render layer pool;

maintain draw commands as the render commands, wherein the render commands are issued to each layer of a rendering engine to render the web content of the electronic device; and merge the render layer and the display layer into a composite layer by a display renderer, wherein the draw commands are maintained in the composite layer as the render commands.

3. The server of claim 2, wherein the processor is further configured:

maintain the draw commands as the render commands in a data structure; and write the data structure to the render structure.

4. The server of claim 2, wherein the processor is further configured to maintain, by executing a program for a display layer pool, the display layer for the render layer cloned at the render layer pool.

5. The server of claim 4, wherein the display layer pool holds a virtual backup for the render layer and maintains the display layer for the render layer cloned at the render layer pool.

6. The server of claim 4, wherein the display layer pool maintains backup of all layers maintained by the render layer pool.

7. The server of claim 2, wherein the processor is further configured to maintain, by a display layer painter, the draw commands as the render commands in a data structure.

8. The server of claim 7, wherein the processor is further configured to write, by the display layer painter, the data structure to the render structure.

* * * * *